US011440372B2

(12) United States Patent
Stubenvoll et al.

(10) Patent No.: US 11,440,372 B2
(45) Date of Patent: Sep. 13, 2022

(54) ROLL STABILIZER, MOTOR VEHICLE, AND METHOD FOR OPERATING A MOTOR VEHICLE

(71) Applicant: Schaeffler Technologies AG & Co. KG, Herzogenaurach (DE)

(72) Inventors: Maximilian Stubenvoll, Fürth (DE); David Nass, Nuremberg (DE); Andreas Zahnleiter, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 171 days.

(21) Appl. No.: 16/763,410

(22) PCT Filed: Nov. 23, 2018

(86) PCT No.: PCT/DE2018/100957
§ 371 (c)(1),
(2) Date: May 12, 2020

(87) PCT Pub. No.: WO2019/105509
PCT Pub. Date: Jun. 6, 2019

(65) Prior Publication Data
US 2021/0070128 A1 Mar. 11, 2021

(30) Foreign Application Priority Data
Dec. 1, 2017 (DE) ...................... 10 2017 128 517.2

(51) Int. Cl.
*B60G 21/055* (2006.01)
*B60G 17/019* (2006.01)

(52) U.S. Cl.
CPC .... *B60G 21/0555* (2013.01); *B60G 17/01941* (2013.01); *B60G 2202/42* (2013.01); *B60G 2202/442* (2013.01); *B60G 2400/0516* (2013.01); *B60G 2400/71* (2013.01); *B60G 2400/98* (2013.01)

(58) Field of Classification Search
CPC ............ B60G 21/0555; B60G 2202/42; B60G 2202/442; B60G 2400/0516; B60G 2204/11; B60G 17/019
See application file for complete search history.

(56) References Cited

U.S. PATENT DOCUMENTS 4,998,865 A * 3/1991 Nakanishi .............. F02M 37/08
310/51
5,641,916 A * 6/1997 Satoh ...................... G01L 3/105
73/862.331
(Continued)

FOREIGN PATENT DOCUMENTS

DE 102013221248 A1 4/2015
DE 102014203207 A1 8/2015
(Continued)

*Primary Examiner* — Frank B Vanaman

(57) ABSTRACT

A roll stabilizer for a motor vehicle includes a plurality of sensors for detecting a plurality of measurement variables, in particular a torque sensor, a rotor position sensor and optionally an actuator temperature sensor. Each of the sensors resides on a separate sensor circuit board which is separate from a motherboard. The motherboard has electronics for evaluating the measurement variables detected by the sensors and/or for forwarding said measurement variables to an external control device.

20 Claims, 2 Drawing Sheets

(56) References Cited

U.S. PATENT DOCUMENTS

| | | | | |
|---|---|---|---|---|
| 6,181,033 | B1* | 1/2001 | Wright | H02K 29/08 |
| | | | | 310/40 MM |
| 7,839,657 | B2* | 11/2010 | Nodine | H05K 1/148 |
| | | | | 361/803 |
| 2001/0029791 | A1* | 10/2001 | Sezaki | G01L 5/221 |
| | | | | 73/862.333 |
| 2008/0106055 | A1* | 5/2008 | Pinkos | B60G 3/20 |
| | | | | 280/124.106 |
| 2015/0155765 | A1* | 6/2015 | Zenowich | H02K 11/33 |
| | | | | 310/71 |
| 2016/0311285 | A1* | 10/2016 | Plettner | B60G 21/055 |
| 2018/0106693 | A1* | 4/2018 | Pattok | G01L 25/003 |

FOREIGN PATENT DOCUMENTS

| | | |
|---|---|---|
| DE | 102014222708 A1 | 5/2016 |
| DE | 102014222710 A1 | 5/2016 |
| DE | 102015116913 A1 | 4/2017 |

* cited by examiner

ROLL STABILIZER, MOTOR VEHICLE, AND METHOD FOR OPERATING A MOTOR VEHICLE

CROSS-REFERENCE TO RELATED APPLICATIONS

This application is the U.S. National Phase of PCT Appln. No. PCT/DE2018/100957 filed Nov. 23, 2018, which claims priority to DE 10 2017 128 517.2 filed Dec. 1, 2017, the entire disclosures of which are incorporated by reference herein.

TECHNICAL FIELD

The disclosure relates to a roll stabilizer for a motor vehicle with several sensors for capturing several measured quantities—in particular, a torque, a rotor position and/or a temperature. The disclosure further relates to a motor vehicle with a roll stabilizer of such a type, and to a method for operating such a motor vehicle.

BACKGROUND

Roll stabilizers are customarily employed in motor vehicles in order to reduce undesirable rolling motions of the vehicle body. An active roll stabilizer that takes the form of an electromechanical roll stabilizer is described in DE 10 2013 221 248 A1, for instance. This roll stabilizer exhibits an electric actuator with a rotor, as well as sensors for capturing a torque of the actuator and for capturing the rotor position. The roll stabilizer further includes a motherboard which is connected to an external control unit via which the roll stabilizer can be driven. This roll stabilizer has proven itself in operation. However, it has turned out to be disadvantageous that for the purpose of capturing the rotor position the sensor is arranged on the motherboard. It is therefore necessary to arrange the motherboard in the immediate vicinity of the output shaft of the rotor and to mount said output shaft in alignment with a counterpart interacting with the rotor-position sensor. To this extent, the freedom in connection with the arrangement of the motherboard within the housing of the roll stabilizer is restricted.

SUMMARY

Against this background, the object is to be able to utilize the relatively small construction space within a housing of a roll stabilizer more flexibly.

The object is achieved by a roll stabilizer for a motor vehicle with several sensors for capturing several measured quantities. One of the sensors is a torque sensor, a further sensor is a rotor-position sensor. Furthermore, the roll stabilizer is provided with an electronic module for evaluating the measured quantities captured by the sensors and/or for forwarding these measured quantities to an external control unit. Several sensor boards are provided, which respectively exhibit at least one of the sensors. Furthermore, a motherboard arranged separately from the sensor boards is provided. One of the sensor boards takes the form of a rotor-position-sensor board which exhibits a rotor-position sensor and is arranged parallel to the motherboard. A further sensor board takes the form of a torque-sensor board which exhibits a torque sensor and is arranged to be transverse relative to the motherboard. The motherboard has been designed without a torque sensor and without a rotor-position sensor.

The motherboard has been designed without a sensor for capturing a torque, a rotor position and/or a temperature of the actuator of the roll stabilizer. Therefore it is possible to arrange the motherboard independently of the sensors within the housing of the roll stabilizer. The sensor boards, which exhibit the respective sensors, can have a reduced size in comparison with the motherboard, and can be positioned within the housing independently of the location of the motherboard. Consequently the construction space within the housing can be utilized more flexibly.

The rotor-position-sensor board can be arranged independently of the location of the motherboard within the housing and can be aligned with a counterpart interacting with the rotor-position sensor, which is arranged to be co-rotating with the output shaft of the actuator. For instance, the rotor-position-sensor board can be arranged to be perpendicular to an axis of rotation of the actuator—that is to say, transverse relative to the axis of the actuator—so that the rotation of a counterpart arranged on an end face of the axis of rotation can be detected. The rotor-position-sensor board is preferably spaced from the motherboard. Particularly preferably, the rotor-position-sensor board has been designed without an electronic module, formed separately from the rotor-position sensor, for evaluating the measured quantity captured by the rotor-position sensor and/or for forwarding this measured quantity, so the size of the rotor-position-sensor board can be reduced. It is particularly advantageous if the rotor-position-sensor board has no further active components besides the rotor-position sensor.

The torque-sensor board is arranged to be transverse relative to the motherboard—that is to say, in a plane that is arranged parallel to a plane containing the actuator axis. By this means, it becomes possible to align the torque sensor with the torque to be measured. For instance, a measuring direction or preferred direction of the torque sensor can be aligned with an axis of rotation of the actuator of the roll stabilizer. The torque sensor has preferably been configured as an integrated circuit arrangement. Particularly preferably, the torque-sensor board has been designed without an electronic module, formed separately from the torque sensor, for evaluating the measured quantity captured by the torque sensor and/or for forwarding this measured quantity, so the size of the torque-sensor board can be reduced. It is particularly advantageous if the torque-sensor board has no further active components besides the torque sensor.

A configuration has proved advantageous in which the roll stabilizer includes a common holding element which bears the motherboard and one of the sensor boards, in particular a torque-sensor board which exhibits a torque sensor. The common holding element may be formed separately from the housing of the roll stabilizer, so that in the course of the manufacture of the roll stabilizer the motherboard and the sensor board are firstly mounted on the common holding element and then, together with the holding element, can be inserted into the housing of the roll stabilizer. The use of a common holding element is particularly advantageous if the torque-sensor board is to be arranged to be transverse—in particular, perpendicular—relative to the motherboard. The common holding element may exhibit a first receiving region for the motherboard and a second receiving region for the sensor board, the receiving regions being oriented transversely—in particular, perpendicularly—relative to one another.

According to a preferred configuration, the motherboard and a sensor board—in particular, a sensor board arranged to be transverse relative to the motherboard—are connected to one another by means of a flexible printed circuit board. The flexible printed circuit board can be bent over, for instance by an angle within the range between 80° and 100°, in particular 90°. The flexible printed circuit board may have been formed from a film, in particular a polyimide film.

According to an expedient further development, the holding element bears the motherboard and the torque-sensor board which is connected to the motherboard by means of the flexible printed circuit board or the flexible conductor track.

The roll stabilizer may exhibit an actuator-temperature sensor via which the temperature of the actuator of the roll stabilizer can be measured. One of the sensor boards may take the form of a temperature-sensor board which exhibits the actuator-temperature sensor. Alternatively, an actuator-temperature sensor may have been arranged on the torque-sensor board or on the rotor-position-sensor board. In addition, a temperature sensor may be arranged on the motherboard, which ascertains the ambient temperature of the motherboard, which may differ from the actuator temperature.

According to an advantageous configuration, the motherboard exhibits a power-supply unit for the sensor boards. Via the power-supply unit, supply voltages—in particular, various supply voltages—can be made available for the individual sensor boards. The power-supply unit preferably exhibits one or more voltage transformers, so that supply voltages can be made available internally that differ from the voltage made available to the roll stabilizer.

The motherboard and the sensor boards may be arranged within a housing of the roll stabilizer.

A further development provides that the motherboard is arranged between the rotor-position-sensor board and the torque-sensor board. In one structural realization in the actuator, this further development offers particular advantages. The rotor-position-sensor board and the torque-sensor board are spatially separated from one another by the motherboard which is arranged between these two sensor boards, viewed in the axial direction along the actuator axis. The actuator may be integrated between two halves of the torsion bar.

The rotor-position-sensor board arranged on the end face of the motherboard facing toward the motor can be employed without difficulty for the purpose of determining the rotor position. The torque-sensor board arranged on the other end face of the motherboard may be turned toward a flange attached to the housing of the actuator in torsion-resistant manner, and may engage therein. In this way, a torque transmitted via this flange can be measured without difficulty by means of the torque sensor. In many applications, a torque measurement on the basis of inverse magnetostriction has proved particularly favorable. In this case, the flange is magnetically coded and, under the action of a torque on the flange, a magnetic field is generated which can be captured via the magnetic-field sensor of the board. The spatial separation of the torque-sensor board from the motor advantageously reduces an influence of electromagnetic fields that are generated by the motor. In addition, with this arrangement of the sensor boards the torque-sensor board may have been provided without difficulty at an axial end of the actuator in the housing or in the flange. The torque-sensor board is expediently arranged in a plane in which the actuator axis is situated, and the rotor-position-sensor board is expediently arranged to be transverse relative to the actuator axis. In numerous applications, the actuator axis and the torsion-bar axis coincide.

The motherboard and/or the sensor boards may take the form of a rigid printed circuit board. Rigid printed circuit boards of such a type are also designated as pcbs.

The roll stabilizer may be active roll stabilizer, in particular an electromechanical roll stabilizer, via which rolling motions of a motor vehicle can be reduced. Such undesirable rolling motions may arise in the course of negotiating curves or driving over bumps. The roll stabilizer can counteract such a roll behavior. The roll stabilizer may include an actuator—in particular, an electric motor—for generating a torque or torsional moment. The electric motor may be connected in torsion-resistant manner to a housing of the roll stabilizer and may exhibit a rotatable rotor which is capable of being rotated with respect to the housing. Via an output shaft, the rotor may be connected to a stabilizer element of the roll stabilizer—in particular, to a torsion-bar spring—which is subjected to torsion.

A motor vehicle with a roll stabilizer described above and may have a control unit for driving the roll stabilizer, which is arranged separately from the roll stabilizer and which is connected to the motherboard of the roll stabilizer via a communication link.

The measured quantities ascertained by means of the sensors of the roll stabilizer—in particular, the torque, the rotor position and/or the actuator temperature—can be made available to the control unit via the motherboard. The control unit can generate commands for the actuator and/or the sensors of the roll stabilizer on the basis of these measured quantities. Such commands of the control unit, which are intended for one of the sensors, can be fed to the sensors via the motherboard.

The roll stabilizer may be arranged on an axle of the motor vehicle. The motor vehicle may exhibit several—in particular, two—roll stabilizers, for instance a first roll stabilizer on a front axle of the motor vehicle and a second roll stabilizer on a rear axle of the motor vehicle.

A method for operating a motor vehicle with a roll stabilizer and with a control unit for driving the roll stabilizer is furthermore proposed. The roll stabilizer exhibiting several sensors for capturing several measured quantities, in particular a torque sensor, a rotor-position sensor and/or an actuator-temperature sensor, and measured quantities being captured by means of the sensors, which are each arranged on a sensor board, and the captured measured quantities being evaluated by means of an electronic module of a motherboard arranged separately from the sensor boards and/or being forwarded to the control unit, the motherboard being designed without a torque sensor, without a rotor-position sensor and without an actuator-temperature sensor.

In the case of the method for operating a motor vehicle with a roll stabilizer, the same advantages can be obtained as have already been described in connection with the roll stabilizer according to the invention.

BRIEF DESCRIPTION OF THE DRAWINGS

Further particulars and advantages will be elucidated below with reference to the embodiment represented in the drawings. Shown herein are.

DETAILED DESCRIPTION

Figure 1:
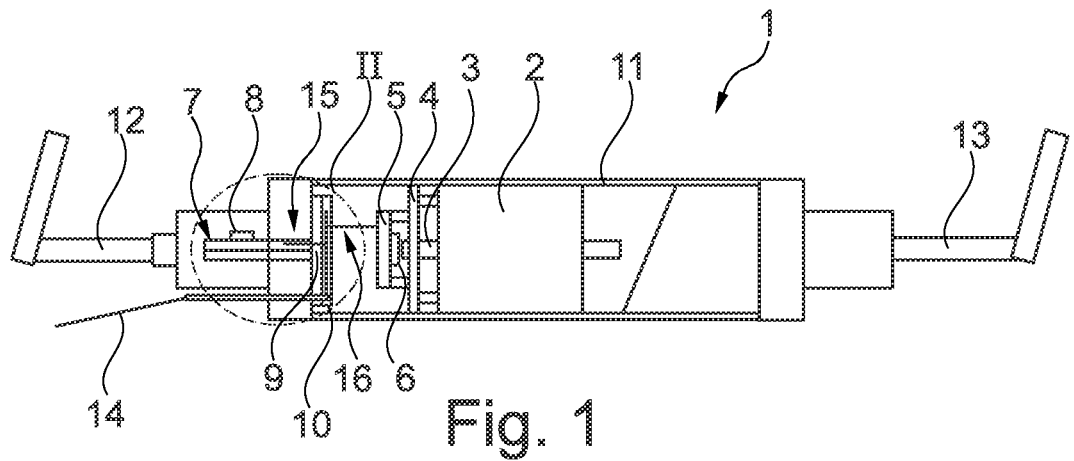
FIG. 1 an embodiment of a roll stabilizer in a schematic partial sectional representation.

In FIG. 1 a roll stabilizer 1 is shown in a partially sectioned representation. The roll stabilizer 1 takes the form of an active, electromechanical roll stabilizer and may find application on an axle of a motor vehicle. The roll stabilizer 1 exhibits two stabilizer elements 12, 13 taking the form of stabilizer arms, which are linked to the wheel suspensions of the respective axle. Between the stabilizer elements 12, 13, an actuator 2 is provided which can subject the stabilizer elements 12, 13 to a torsional moment.

The actuator 2 is arranged within a housing 11 of the roll stabilizer 1. Furthermore, several sensors 6, 8 for capturing various measured quantities are arranged within the housing 11. A first sensor 6 takes the form of a rotor-position sensor. The rotor-position sensor 6 is arranged on a rotor-position-sensor board 5. Said sensor has been configured as a rotor-position sensor with a digitizing and transmitting unit, and interacts with a counterpart which moves with the rotor 3 of the actuator 2, which has been configured as an output shaft. A second sensor 8 takes the form of a torque sensor and is arranged on a torque-sensor board 7. The torque-sensor board 7 and the torque sensor are arranged parallel to a torque—in particular, a torsional moment—generated by the actuator 2. To this extent, the torque-sensor board 7 is oriented perpendicularly relative to the rotor-position-sensor board 5. The torque sensor 8 preferably takes the form of a magnetic-field sensor and interacts with a magnetized region of the stabilizer element 12 surrounding it.

A further integral part of the roll stabilizer 1 is a motherboard 10, arranged separately from the sensor boards 5, 7, which has been designed without a torque sensor or a rotor-position sensor or an actuator-temperature sensor and exhibits an electronic module 20 for evaluating the measured quantities captured by the sensors 6, 8 and/or for forwarding these measured quantities to an external control unit 101. The measured quantities captured by the sensors 6, 8 are communicated to the motherboard 10 via connecting lines 15, 16. A further connecting line 14 connects the motherboard 10 to the control unit 101 arranged outside the roll stabilizer.

In the embodiment, the rotor-position board 5 is arranged parallel to the motherboard 10, spaced therefrom. The torque-sensor board 7 is provided perpendicular to the motherboard 10.

The roll stabilizer 1 according to FIG. 1 may optionally exhibit an actuator-temperature sensor. The latter may have been provided, for instance, as part of a further sensor board—that is to say, a temperature-sensor board—or may have been arranged on the torque-sensor board or on the rotor-position-sensor board. In any case, the actuator-temperature sensor is connected to the motherboard 10 via a further connecting line, so that the evaluation of the measured quantity captured by the actuator-temperature sensor and/or the forwarding of this measured quantity can be undertaken by the electronic module 20 of the motherboard 10.

Figure 2:
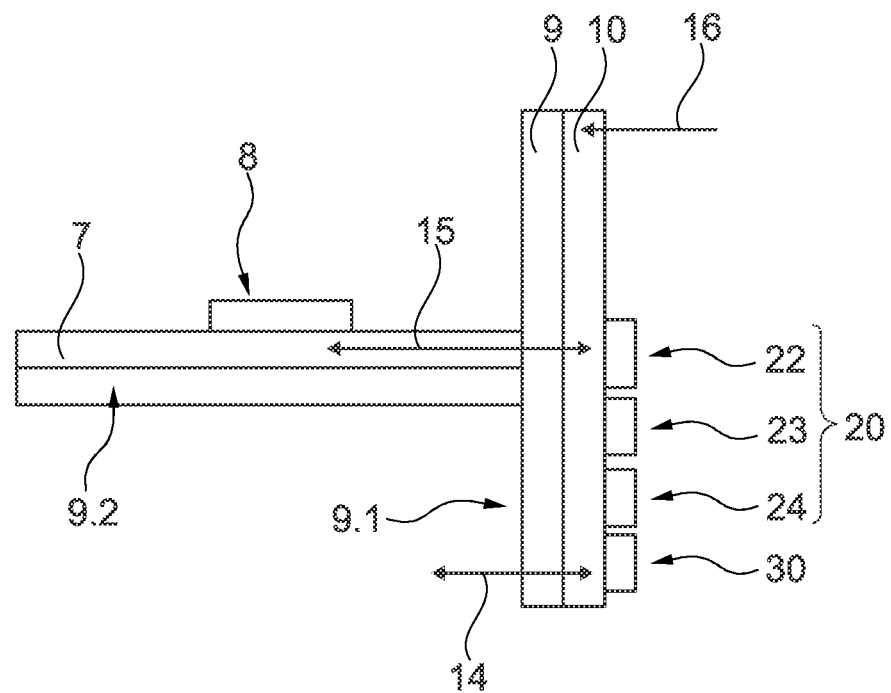
FIG. 2 an embodiment of a common mounting for the motherboard and a sensor board in a schematic sectional representation (detail II from FIG. 1)

FIG. 2 shows a detailed representation of a region II (cf. FIG. 1) which includes the motherboard 10 and the torque-sensor board 7. The motherboard 10 and the torque-sensor board 7 are arranged on a common holding element 9 which bears both boards 7, 10. For this purpose, the holding element 9 exhibits a first receiving region 9.1, for receiving the motherboard 10, and a second receiving region 9.2 for receiving the torque-sensor board 7 with the torque sensor 8. The first receiving region 9.1 has been rotated by 90° with respect to the second receiving region 9.2, so that the boards 7, 10 can be arranged perpendicular to one another.

The torque-sensor board 7 has no further active components besides the torque sensor 8. The motherboard is equipped with an electronic module 20 and with a power-supply unit 30. The electronic module 20 exhibits a data-forwarding unit 22, a data-capture and data-processing unit 23 and a communication unit 24, which will be considered in more detail below.

According to a modification, not represented in the figures, of the embodiment, the motherboard 10 and the torque-sensor board 7 are connected to one another by means of a flexible printed circuit board or by means of a flexible conductor track, for example a flat ribbon cable.

Figure 3:
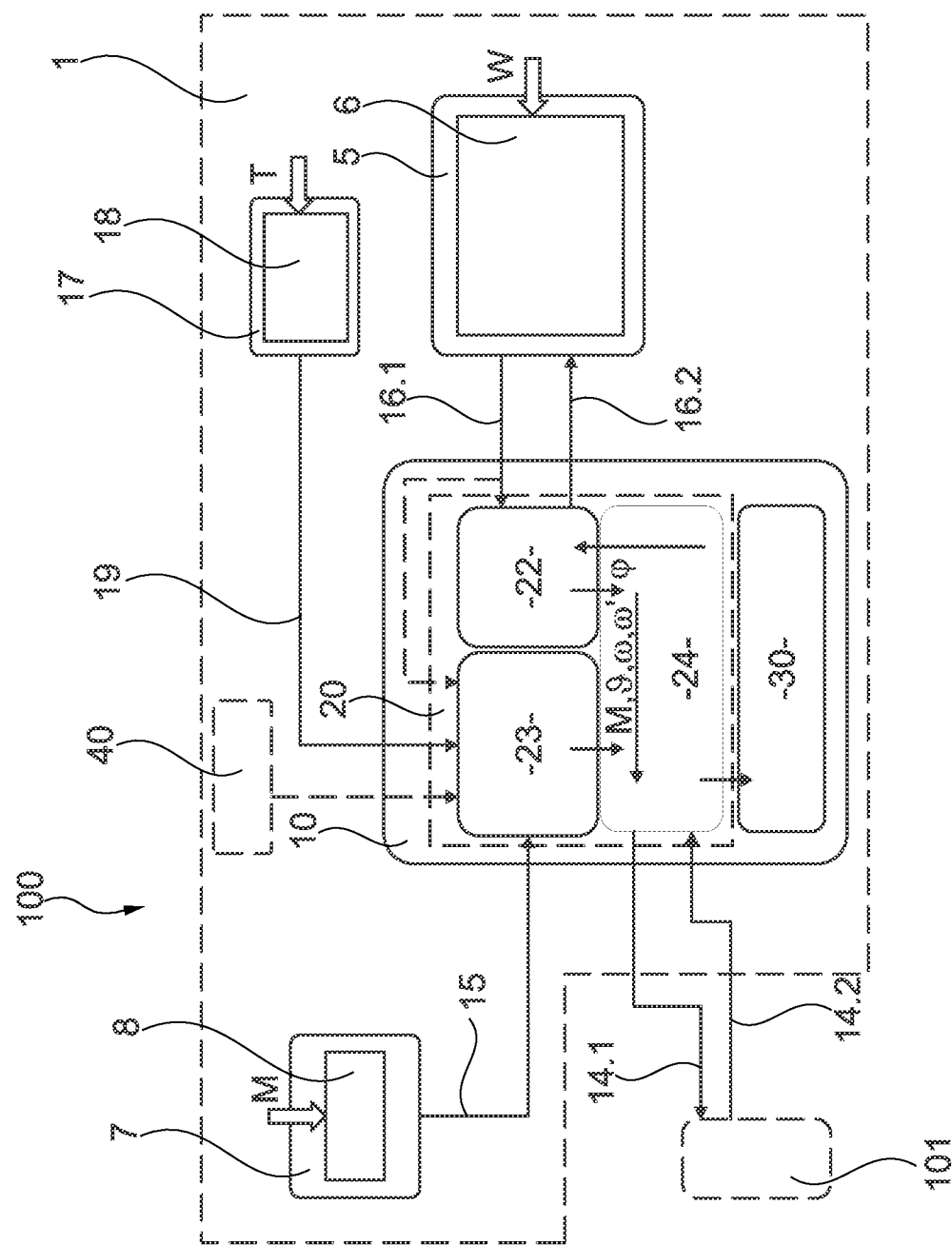
FIG. 3 a block diagram of an embodiment of a motor vehicle.

In FIG. 3 a block diagram is shown of an exemplary motor vehicle 100 according to the invention. The motor vehicle 100 exhibits a first roll stabilizer 1, arranged on a front axle, and a second roll stabilizer 1 arranged on a rear axle, of which in FIG. 3, for the sake of clarity, only the first roll stabilizer 1 has been represented. A further integral part of the motor vehicle 100 is a control unit 101 for driving the roll stabilizers, which is arranged separately from the roll stabilizers 1 and which is connected to the motherboard 10 of the respective roll stabilizer 1 via a communication link 14.1, 14.2.

The roll stabilizers 1 take the form of active—in particular, electromechanical—roll stabilizers. The first and the second roll stabilizer 1 each exhibit an actuator 2, not shown in FIG. 3, in particular an electric motor, which can generate a torque or torsional moment. The two roll stabilizers 1 each include a torque sensor 8 for measuring a torque which subjects a stabilizer element 12 to torsion. In addition, in each roll stabilizer 1 a rotor-position sensor 6 is provided, via which the location of the rotor 3 can be measured. Furthermore, each roll stabilizer 1 exhibits an actuator-temperature sensor 18 for measuring the temperature of the actuator 2 of the roll stabilizer 1. The roll stabilizer may optionally exhibit one or more further sensors 40, in particular temperature sensors.

The sensors 6, 8, 18, 40 are respectively arranged on their own sensor board 5, 7, 17 which can be placed in the interior of the housing as required. In functional respects, the sensor boards 5, 7, 17 have been configured as simple data-capture elements.

Separately from the sensor boards 5, 7, 17, furthermore a motherboard 10 is provided which has been designed without a torque sensor, without a rotor-position sensor and without an actuator-temperature sensor. An electronic module 20 and a power supply 30 for the sensor boards 5, 7, 17 have been provided on the motherboard 10.

The temperature-sensor board 17 includes the actuator-temperature sensor 18 via which, in particular, the temperature T of the actuator 2 is measured. Via a first connecting line 19 between the temperature-sensor board 17 and the motherboard 10, a voltage signal, in particular an analog voltage signal, is communicated to the electronic module 20 of the motherboard 10.

The torque-sensor board 7 exhibits the torque sensor 8 via which the torque M generated by the actuator 2 or a torque M applied to the stabilizer elements 12, 13 from outside is measured. Via a second connecting line 15 between the torque-sensor board 7 and the motherboard 10, a signal, in particular an analog signal, is communicated to the electronic module 20 of the motherboard 10.

The rotor-position-sensor board 5 includes the rotor-position sensor 6 via which the rotor position W is measured. A signal-processing and signal-digitizing module integrated within the rotor-position sensor 6 makes a digital rotor-position signal available. The rotor-position-sensor board 5 is connected to the motherboard 10 via a third connecting line 16.1 and fourth connecting line 16.2. The captured rotor position is forwarded to the electronic module 20 of the motherboard 10 via the third connecting line 16.1. The fourth connecting line 16.2 enables the relaying of a trigger signal from the electronic module 20 or the external control unit 101 to the rotor-position sensor 5.

The motherboard 10 includes a power-supply unit 30 for the sensor boards 5, 7, 17. Supply voltages for the individual sensor boards 5, 7, 17 can be made available via this power-supply unit 30. For instance, the power-supply unit 30 may exhibit one or more voltage transformers, so that supply voltages that differ from the voltage made available to the roll stabilizer can be made available to the sensor boards 5, 7, 17.

The motherboard 10 further includes an electronic module 20 for evaluating the measured quantities captured by the sensors 6, 8, 18, 40 and/or for forwarding these measured quantities to the external control unit 101. As part of the electronic module 20, amongst other components a data-forwarding unit 22, a data-capture and data-processing unit 23 and a communication unit 24 have been provided on the motherboard. Measured values—in particular, the rotor position measured by means of the rotor-position sensor 5—can be forwarded unchanged to the external control unit 101 via the data-forwarding unit 22. No manipulation of the forwarded data takes place in the data-forwarding unit 22. Optionally, the measured rotor position can, alternatively or additionally, be supplied to the data-capture and data-processing unit 23. In the data-capture and data-processing unit 23 the rotor speed and/or the rotor acceleration can be ascertained on the basis of the measured rotor position. The data-capture and data-processing unit 23 is used, furthermore, to capture, to digitize and to process the measured signals of the torque sensor 8, of the temperature sensor 18 and also of further sensors 40 which may be present. To this extent, a common data-capture and data-processing unit 23 can be used for processing the signals of several—in particular, of all—sensors 5, 7, 18, 40 of the roll stabilizer 1.

The roll stabilizers 1, described above, for a motor vehicle 100 each exhibit several sensors 6, 8, 18, 40 for capturing several measured quantities, in particular a torque sensor 8, a rotor-position sensor 6 and/or an actuator-temperature sensor 18. The roll stabilizers 1 include several sensor boards 5, 7, 17, which respectively exhibit at least one of the sensors 6, 8, 18, and a motherboard 10, arranged separately from the sensor boards 5, 7, 17, which has been designed without a torque sensor, without a rotor-position sensor and without an actuator-temperature sensor, and an electronic module 20 for evaluating the measured quantities captured by the sensors 6, 8, 18 and/or for forwarding these measured quantities to an external control unit 101. By this means, the relatively small construction space within the housing 11 of the roll stabilizer 1 can be utilized more flexibly. Furthermore, the following advantages arise:

A sensor board 5, 7, 17 can be connected, or not, to the motherboard 10 as required, no further changes to the motherboard 10 or to other sensor boards 5, 7, 17 becoming necessary as a result of this.

The sensor boards 5, 7, 17 can have a relatively small size, since only a few components have to be arranged on them.

Since the orientation of the sensor boards 5, 7, 17 is independent of the orientation of the motherboard 10, the sensors 6, 8, 18, 40 can be arranged in accordance with the measuring principle (for example, axially or radially).

LIST OF REFERENCE SYMBOLS 1 roll stabilizer
2 actuator
3 rotor
4 mounting
5 rotor-position-sensor board
6 rotor-position sensor
7 torque-sensor board
8 torque sensor
9 holding element
9.1 receiving region
9.2 receiving region
10 motherboard
11 housing
12 stabilizer element
13 stabilizer element
14.1 connecting line
14.2 connecting line
15 connecting line
16.1 connecting line
16.2 connecting line
17 temperature-sensor board
18 temperature sensor
19 connecting line
20 electronic module
22 data-forwarding unit
23 data-capture and data-processing unit
24 communication unit
30 power-supply unit
100 motor vehicle
101 control unit
T temperature
M torque
W angle of rotation

The invention claimed is:

1. A roll stabilizer for a motor vehicle comprising:
   an actuator having an actuator axis;
   a motherboard having an electronic module, the motherboard arranged to be transverse relative to the actuator axis;
   a rotor-position-sensor board arranged parallel to the motherboard and having a rotor-position sensor; and
   a torque-sensor board arranged transverse to the motherboard and having a torque sensor;
   wherein:
     the electronic module receives signals from the rotor-position sensor and the torque sensor; and
     the motherboard is arranged between the rotor-position-sensor board and the torque-sensor board.

2. The roll stabilizer of claim 1, further comprising a holding element which bears the motherboard and one of the rotor-position-sensor board and the torque-sensor board.

3. The roll stabilizer of claim 1 wherein the motherboard and one of the rotor-position-sensor board and the torque-sensor board are connected to one another by a flexible printed circuit board or a flexible conductor track.

4. The roll stabilizer of claim 1, further comprising an actuator-temperature sensor on the torque-sensor board, on the rotor-position-sensor board, or on another sensor board.

5. The roll stabilizer of claim 1, wherein the motherboard has a power-supply unit for the rotor-position-sensor board and for the torque-sensor board.

6. The roll stabilizer of claim 1, wherein the motherboard, the rotor-position-sensor board, and the torque-sensor board are arranged within a housing of the roll stabilizer.

7. A motor vehicle comprising:
a roll stabilizer as claimed in claim 1; and
a control unit for driving the roll stabilizer arranged separately from the roll stabilizer and connected to the motherboard of the roll stabilizer via a communication link.

8. A roll stabilizer for a motor vehicle comprising:
an actuator having an actuator axis;
a motherboard having an electronic module arranged thereon, the electronic module including:
a signal acquisition and data processing unit;
a data forwarding unit;
a power supply unit; and
a rotor-position-sensor board:
arranged separately from and parallel to the motherboard; and
having a rotor-position sensor arranged thereon; and
a torque-sensor board:
arranged separately from and transverse to the motherboard; and
having a torque sensor arranged thereon; and
wherein the electronic module is configured to receive a first signal from the rotor-position sensor and a second signal from the torque sensor.

9. The roll stabilizer of claim 8 wherein the motherboard does not include another rotor-position sensor or another torque sensor.

10. The roll stabilizer of claim 8, further comprising an actuator-temperature sensor configured to send a third signal to the electronic module.

11. The roll stabilizer of claim 8, wherein the motherboard and the rotor-position-sensor board are arranged within a housing of the roll stabilizer.

12. The roll stabilizer of claim 8, wherein the data forwarding unit is configured to receive the first signal and the signal acquisition and data processing unit is configured to receive the second signal.

13. The roll stabilizer of claim 12, wherein the electronic module further comprises a communication unit configured to: i) receive signals from the data forwarding unit and the data processing unit, and ii) communicate the signals to an external control unit outside of the roll stabilizer.

14. A roll stabilizer for a motor vehicle comprising:
an actuator having an actuator axis;
a housing;
an insertable holding element assembly configured to be installed as a unit assembly within the housing; the insertable holding element assembly having:
a holding element including:
a first region configured to receive a motherboard, the motherboard having an electronic module arranged thereon; and
a second region configured to receive a torque-sensor board so that the torque-sensor board is arranged: i) parallel to the actuator axis, and ii) transverse to the motherboard, and the torque-sensor board having a torque sensor arranged thereon; and
wherein the electronic module is configured to receive signals from the torque sensor and a rotor position sensor arranged within the housing.

15. The roll stabilizer of claim 14 wherein the motherboard and the torque-sensor board are connected to one another by a flexible printed circuit board or a flexible conductor track.

16. The roll stabilizer of claim 14 wherein the motherboard does not include another torque sensor or another rotor position sensor.

17. The roll stabilizer of claim 14, further comprising an actuator-temperature sensor on the torque-sensor board or on another sensor board.

18. The roll stabilizer of claim 14, wherein the motherboard has a power-supply unit for the torque-sensor board.

19. The roll stabilizer of claim 14, wherein the electronic module is configured to communicate with an external control unit outside of the roll stabilizer.

20. The roll stabilizer of claim 14, wherein the rotor position sensor is arranged parallel to the motherboard.

* * * * *